US010207591B2

United States Patent
Ng

(10) Patent No.: US 10,207,591 B2
(45) Date of Patent: Feb. 19, 2019

(54) MOBILE VEHICLE CHARGING SYSTEM

(71) Applicant: AMKO SOLARA LIGHTING CO., LTD., Taipei (TW)

(72) Inventor: Michael Ng, Taipei (TW)

(73) Assignee: AMKO SOLARA LIGHTING CO., LTD., Taipei (TW)

( * ) Notice: Subject to any disclaimer, the term of this patent is extended or adjusted under 35 U.S.C. 154(b) by 192 days.

(21) Appl. No.: 15/232,777

(22) Filed: Aug. 9, 2016

(65) Prior Publication Data
US 2018/0043782 A1   Feb. 15, 2018

(51) Int. Cl.
*H02J 7/00* (2006.01)
*B60L 11/18* (2006.01)
*B64C 39/02* (2006.01)
*H02J 7/02* (2016.01)

(52) U.S. Cl.
CPC ......... *B60L 11/182* (2013.01); *B60L 11/1831* (2013.01); *B64C 39/024* (2013.01); *B64C 2201/042* (2013.01); *H02J 7/025* (2013.01)

(58) Field of Classification Search
CPC ......... H02J 50/10–50/90; B60L 11/182; B60L 11/1829; B60L 11/1831
USPC .................. 320/101, 108; 307/104
See application file for complete search history.

(56) References Cited

U.S. PATENT DOCUMENTS

| | | | |
|---|---|---|---|
| 9,704,409 B2 * | 7/2017 | Prakash | B64C 39/024 |
| 2008/0169910 A1 * | 7/2008 | Greene | H02J 50/70 340/10.34 |
| 2013/0029595 A1 * | 1/2013 | Widmer | H04B 5/0031 455/39 |

* cited by examiner

*Primary Examiner* — Zixuan Zhou
(74) *Attorney, Agent, or Firm* — Leong C. Lei

(57) ABSTRACT

The mobile vehicle charging system is applied to a mobile vehicle and includes a docking platform and a charging device. The docking platform provides parking to the mobile vehicle. The charging device includes an electricity transmission interface and an electricity measurement module. When the mobile vehicle is parked on the docking platform, the electricity transmission interface charges a battery module through an electricity reception interface of the mobile vehicle. As such, when an operator of the mobile vehicle parks the mobile vehicle onto the docking platform, the mobile vehicle can be automatically charged by the mobile vehicle charging system.

16 Claims, 4 Drawing Sheets

MOBILE VEHICLE CHARGING SYSTEM

BACKGROUND OF THE INVENTION

(a) Technical Field of the Invention

The present invention is generally related to charging systems, and more particular to a charging system for a motor vehicle.

(b) Description of the Prior Art

An unmanned aerial vehicle (UAV) has to carry a fuel tank or battery as power source. For an extended flying distance, a bigger and heavier fuel tank or battery is required, inevitably increasing the weight of the UAV. Especially, for UAVs using lithium battery, this is a bottleneck for the endurance of these UAVs.

FIG. 1 is a schematic diagram showing a scenario of a mobile vehicle charged by a conventional charging device. As illustrated, when the mobile vehicle 1 is operated, its electricity is gradually depleted. As the electricity of the mobile vehicle 1 is nearly fully depleted, an operator of the mobile vehicle 1 would recall the mobile vehicle 1, manually connect the mobile vehicle 1 to a charging device 2 so as to charge the mobile vehicle 1 or replace the mobile vehicle 1's battery. This way of re-supply electricity is rather inconvenient for the operator since manual operation is involved, and the mobile vehicle cannot be charged remotely. In addition, due to the limitation resulted from electricity supply, the mobile vehicle 1 can only be operated (for example, for aerial photographing) for a short period of time and within a short distance to a target location G. The mobile vehicle 1 with such short endurance therefore is not competent for disaster relief or exploration. Even though the mobile vehicle 1 is indeed put to these tasks, the efficiency of disaster relief and exploration is severely compromised as the mobile vehicle 1 has to be recharged constantly.

One way to resolve the above problem is to install and staff multiple charging devices 2 around the target location G so that the mobile vehicle 1 does not need to move back and forth, wasting electricity along the way. However this solution still has its drawbacks, and there may be budget issue if multiple charging devices is to be installed and staffed. Space also may not be available, especially for modern developed cities.

As described above, in order to supply mobile vehicle 1's electricity, conventionally the mobile vehicle 1 has to be recharged or its battery has to be replaced, both repeatedly and manually, which is very inconvenient. Therefore, a major issue for the mobile vehicles is to design a charging system with simplified supply of electricity while resolving the problems of budget limitation and space availability.

SUMMARY OF THE INVENTION

Therefore a mobile vehicle charging system is provided herein so as to obviate the shortcomings of the prior art.

A major objective of the present invention is to provide a mobile vehicle charging system for a mobile vehicle. The mobile vehicle includes a power module, a battery module, and an electricity reception interface where the mobile vehicle is moved by the power module, the battery module is electrically connected to the power module, and provides electricity to the power module, and the electricity reception interface is electrically connected to the battery module and receives electricity through induction in a wireless manner. The mobile vehicle charging system includes a docking platform for the mobile vehicle to park and a charging device having an electricity transmission interface and an electricity measurement module. When the mobile vehicle is parked on the docking platform, the electricity transmission interface charges the battery module through the electricity reception interface. The electricity measurement module is electrically connected to the electricity transmission interface and measures a volume of electricity transmitted through the electricity transmission interface.

Another objective of the present invention is that the mobile vehicle further includes an identification tag. The mobile vehicle charging system further includes an identification module configured in the docking platform. When the mobile vehicle is parked on the docking platform, the identification module detects the identification tag on the mobile vehicle and, after the identification tag is authenticated, engages the charging device to charge the mobile vehicle. In addition, the mobile vehicle charging system further includes a server device. The server device includes a storage unit storing a number of account data. The server device is linked with the identification module and the charging device through a network. The server device receives an identification signal from the identification module after detecting the identification tag through the network. The server device stores the identification signal in the storage unit, and compares the identification signal against the account data in the storage unit for authentication. After the identification signal is authenticated, the server device transmits an actuation signal to the charging device and the charging device starts charging the mobile vehicle after receiving the actuation signal. Furthermore, the charging device produces a charging information according to a volume of electricity charged measured by the electricity measurement module, and delivers the charging information to the server device. After receiving the charging information, the server device stores the charging information into an account of the storage unit corresponding to the identification signal.

As such, a party authorized to be serviced by the mobile vehicle charging system can be effectively identified, and an effective billing model can be established, thereby enhancing the present invention's industrial applicability.

Yet another objective of the present invention is that the docking platform further includes a guidance module configured on the docking platform for guiding the mobile vehicle to park on the docking platform. As such, an operator of the mobile vehicle is able to locate the docking platform, and park the mobile vehicle onto the docking platform smoothly.

Still another objective of the present invention is that the docking platform further includes a level calibration module configured on the docking platform for automatically detecting and adjusting a degree of levelness of the docking platform. The docking platform may also include a positioning module configured on the docking platform for steadily positioning the mobile vehicle on the docking platform when the mobile vehicle is parked on the docking platform.

As such, the mobile vehicle is parked on the docking platform, the docking platform is automatically balanced by the level calibration module and, through the positioning module, the mobile vehicle is steadily parked on the docking platform.

Still another objective of the present invention is that mobile vehicle charging system further includes a camera module and an image processing device. The camera module is configured on the docking platform for capturing images within a coverage range around the docking platform and turning the captured images into an image signal. The image processing device is linked with the camera module through a network and receiving the image signal through the network. The image processing device has a playback module for playing the image signal received from the camera module.

As such, if for security's sake or if there is a need to monitor the mobile vehicle, the operator of the mobile vehicle is able to monitor the mobile vehicle at all times through the image processing device.

Furthermore, the image processing device can be linked with a number of camera modules on a number of docking platforms, and receives the image signals separately from the camera modules. The operator of the mobile vehicle therefore is able to view images of the mobile vehicle from different perspectives simultaneously so as to fully grasp the status of the mobile vehicle. The camera modules of multiple docking platforms can be set up and jointly form a grid, more precise or widespread surveillance therefore can be achieved through the integration of the image signals from the camera modules, thereby enhancing the surveillance effect of the mobile vehicle along its movement path.

In order to more completely and fully deploy the mobile vehicle charging system of the present invention, so that the operator of the mobile vehicle can charge the mobile vehicle any time and any place through the mobile vehicle charging system, one additional objective of the present invention is that multiple docking platforms can be configured on a number of street lamps, respectively. Due to that the street lamps are existing and ubiquitous facilities and no additional expense or space is required, the mobile vehicle charging systems can be quickly deployed, resolving the problems of budget limitation and space availability.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
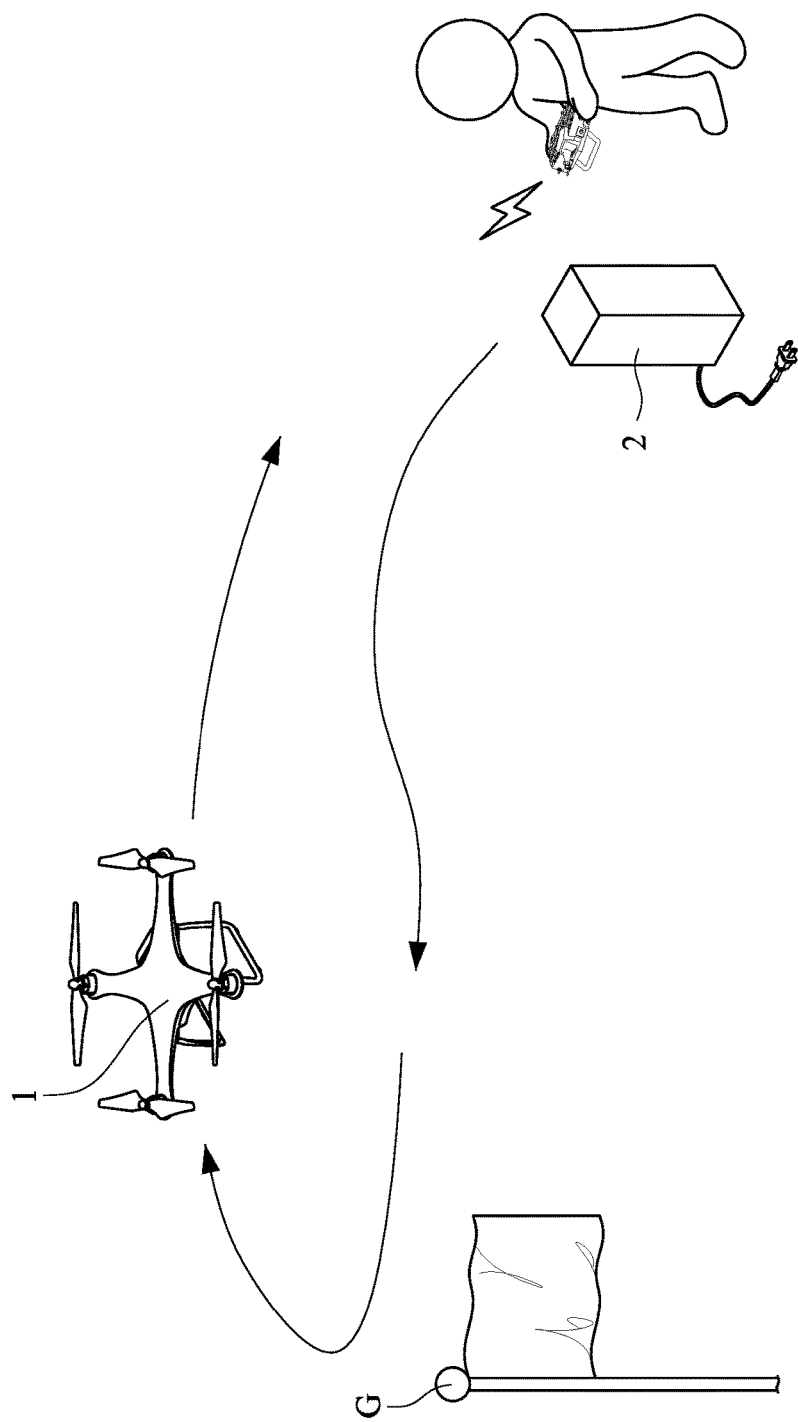
FIG. 1 is a schematic diagram showing a scenario of a mobile vehicle charged by a conventional charging device.
Figure 2:
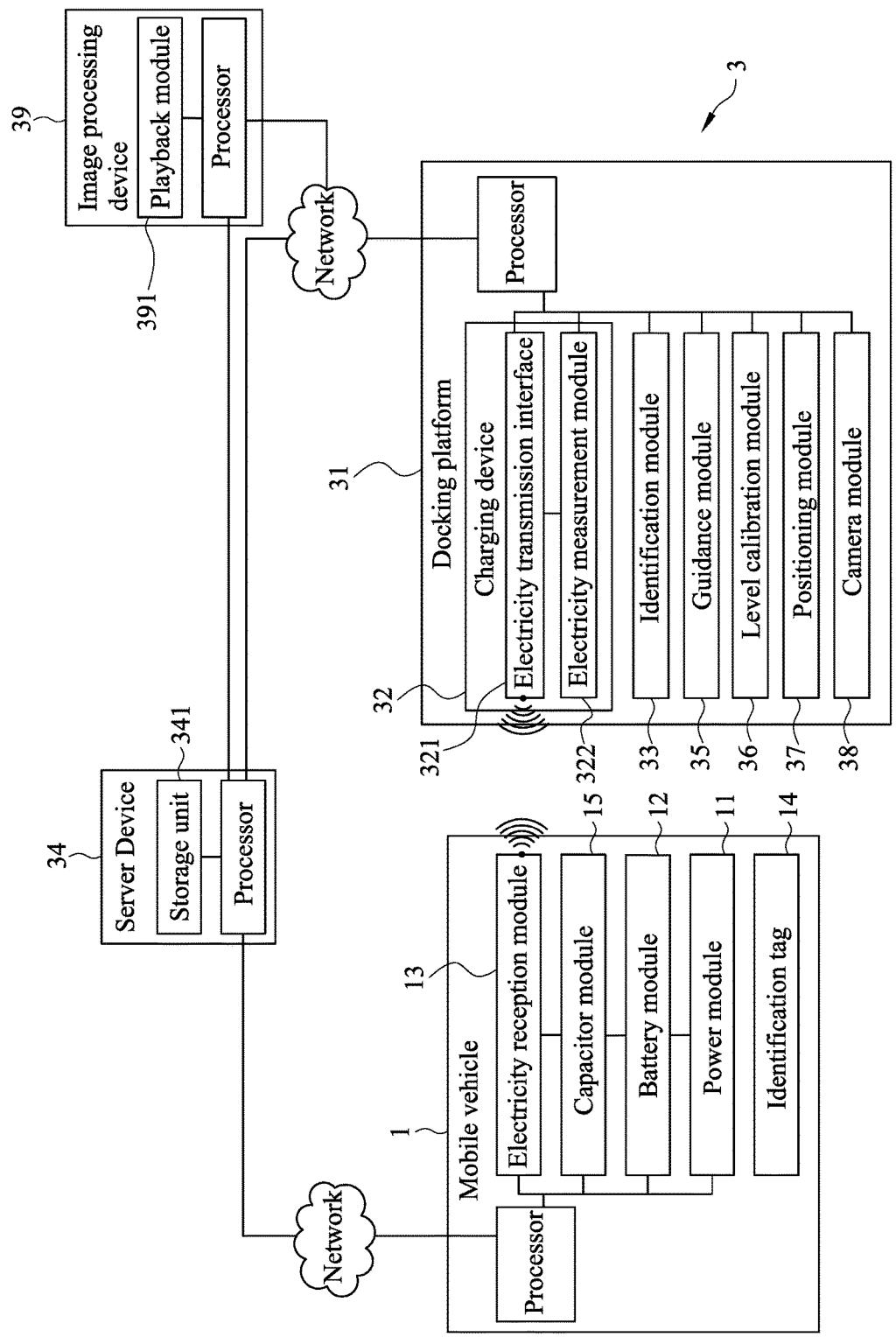
FIG. 2 is a functional block diagram showing a mobile vehicle charging system according to an embodiment of the present invention.

As shown in FIG. 2, a mobile vehicle charging system 3 according to an embodiment of the present invention is applied to a mobile vehicle 1 which may be an electrical bike, an electrical car, an electrical vessel, or an unmanned aerial vehicle (UAV, or drone). The mobile vehicle 1 includes a power module 11, a battery module 12, and an electricity reception interface 13. The mobile vehicle 1 is moved (such as an electrical car's driving or an UAV's flying) by the power module 11. The battery module 12 is electrically connected to the power module 11, and provides electricity to the power module 11 so as to power the power module 11 to move the mobile vehicle 1. In the present embodiment, the battery module 12 is a lithium ion battery or similar electricity storage device. The electricity reception interface 13 is electrically connected to the battery module 12. When the battery module 12 does not have enough stored electricity, an operator of the mobile vehicle 1 may charge the battery module 12 through the electricity reception interface 13.

Figure 3:
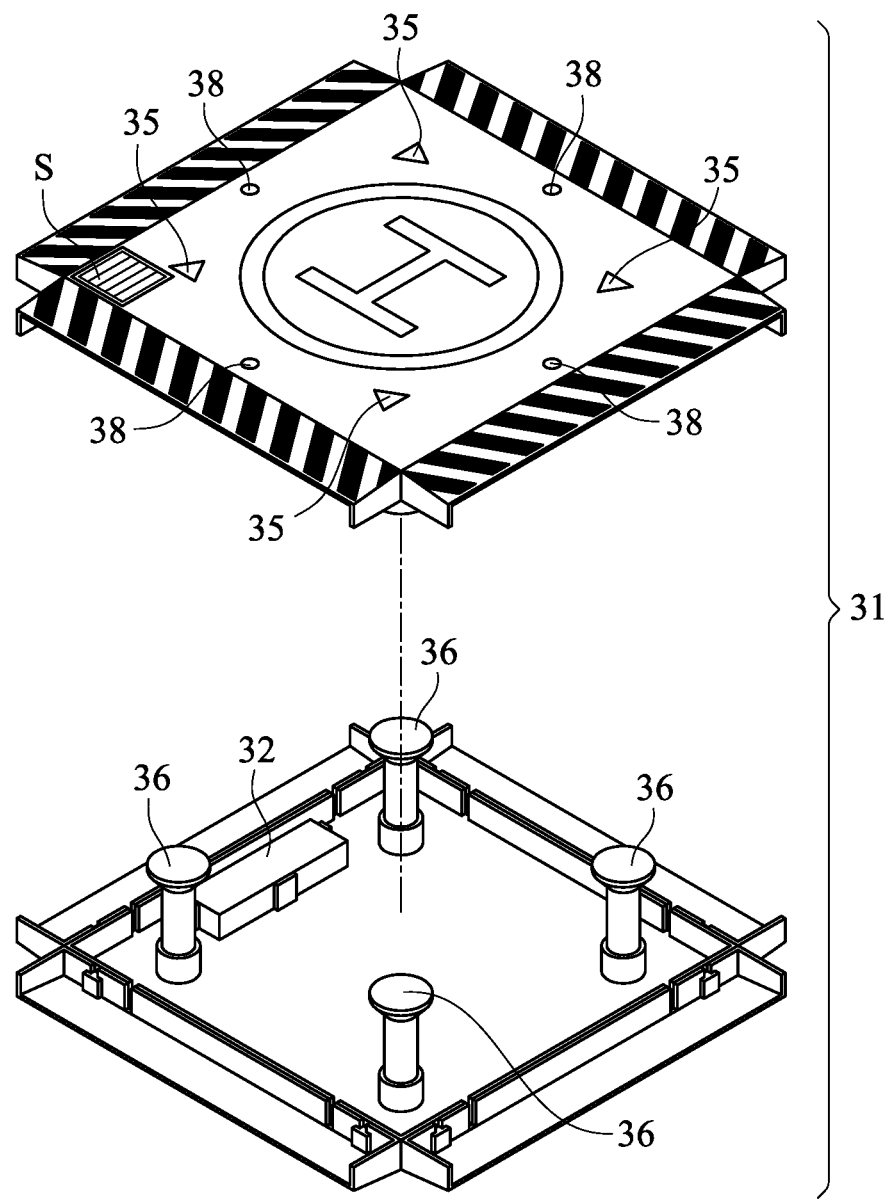
FIG. 3 is a perspective diagram showing a docking platform of the mobile vehicle charging system of FIG. 2.

The mobile vehicle charging system 3 also includes a docking platform 31 and a charging device 32. The docking platform 31 provides a spot for the mobile vehicle 1 to dock, park, or land. In the present embodiment, the docking platform 31 is a stand supporting the mobile vehicle 1 such as an UAV. The term "platform" is not intended to limit the present invention. The charging device 32 includes an electricity transmission interface 321 and an electricity measurement module 322. When the mobile vehicle 1 is parked on the docking platform 31, the electricity transmission interface 321 charges the battery module 12 through the electricity reception interface 13. In the present embodiment, the electricity reception interface 13 is an induction charging coil, and electricity is induced and transmitted between the charging device 32 and the mobile vehicle 1 in a wireless manner such as near field communications. In this way, the operator of the mobile vehicle 1 is not required to physically plugging a power cable into the mobile vehicle 1 and, to charge the battery module 12, the operator simply parks the mobile vehicle 1 on the docking platform 31, greatly enhancing operation convenience. In addition, since near field communications technique is adopted in the present embodiment, other features such as authentication may be added for greater applicability. However the present invention is not limited as such, and other wireless charging technique other than near field communications can be adopted as well. This variation should be familiar to people skilled in the related art and should still be covered by the scope of the present invention. It should be noted that the charging device 32 may obtain its electricity from a power source through a power cable. Other than that, a solar panel S (as shown in FIG. 3) can also be configured on the docking platform 31 as an auxiliary power source. In the present embodiment, the solar panel S is disposed at a corner of the docking platform 31, but it is not limited as such. For example, the solar panel S may cover the entire surface of the docking platform 31, or the solar panel S may be configured to the sides of the docking platform 31. Furthermore, the power cable, in addition to the provision of electricity, may also provide a powerline network so that other networking devices may be added to the docking platform 31 so that the docking platform 31 can also function as a wireless network hotspot, etc.

In the present embodiment, the mobile vehicle 1 further includes a capacitor module 15 electrically connected to the electricity reception interface 13 and, through a fast removable connector (not shown), to the battery module 12 so that, when conducting maintenance, the capacitor module 15 and/or the battery module 12 can be conveniently dismounted. In the present embodiment, the capacitor module 15 is a supercapacitor. When the electricity reception interface 13 receives electricity signals from the electricity transmission interface 321, the induced electricity is first temporarily stored in the capacitor module 15, and then released to the battery module 12. As such, the mobile vehicle 1's electricity storage system (including the capacitor module 15 and the battery module 12) is able to go through multiple charging and discharging cycles, enhancing its robustness. It should be noted that, in order to increase storage capacity, to extend the mobile vehicle 1's continuous operation time, and to reduce the dimensions of the mobile vehicle 1, the capacitor module 15 can be designed as a casing to the mobile vehicle 1. Additionally, the capacitor module 15 may further include a control element (not shown) controlling the capacitor module 15 to receive electricity from the electricity reception interface 13 and/or to discharge electricity to the battery module 12. The control element may also continuously monitor the capacitor module 15's status. Therefore, for the mobile vehicle charging system 3 of the present invention applied to the mobile vehicle 1, the supercapacitor is not merely charged through simple chemical reactions like an ordinary battery, but is able to quickly store energy in an electrical field environment. Through the supercapacitor together with the wireless charging technique described above, the mobile vehicle 1 can quickly obtain required electricity.

As shown in FIG. 2, the electricity measurement module 322 is electrically connected to the electricity transmission interface 321 and measures a volume of electricity transmitted through the electricity transmission interface 321. In the present embodiment, the electricity measurement module 322 is an advanced meter, and the measurement may be used by a service provider offering the mobile vehicle charging system 3 for billing purpose. As shown in FIG. 3, the docking platform 31 is a stand and the charging device 32 is configured inside the stand (i.e., the docking platform 31). Alternatively, the charging device 32 may also be independently disposed outside and adjacent to the docking platform 31. As long as the charging device 32 is able to charge the mobile vehicle 1 parked on the docking platform 31, the various locations of the charging device 32 all fall within the scope of the present invention.

As shown in FIG. 2, the mobile vehicle 1 further includes an identification tag 14 and the mobile vehicle charging system 3 includes an identification module 33. In some embodiments, a Radio Frequency Identification (RFID) tag and Bluetooth Low Energy (BLE) technique are adopted. However, the present invention is not limited as such. In the present embodiment, the identification module 33 is configured in the docking platform 31 so that, when the mobile vehicle 1 is parked on the docking platform 31, the identification module 33 is able to detect the identification tag 14 on the mobile vehicle 1 and, after the identification tag 14 is authenticated, the charging device 32 is engaged to charge the mobile vehicle 1. The mobile vehicle charging system 3 further includes a server device 34 having a storage unit 341 where a number of account data are stored. The server device 34 is linked with the identification module 33 and the charging device 32 through a network. The identification module 33 issues an identification signal after detecting the identification tag 14. The server device 34 receives the identification signal through the network, stores the identification signal in the storage unit 341, and compares the identification signal against the account data in the storage unit 341 for authentication. For example, the operator of the mobile vehicle 1 has made a registration to the service provider of the mobile vehicle charging system 3, and provides the identification tag 14 of the mobile vehicle 1 to the service provider so that an account corresponding to the identification tag 14 is set up in the storage unit 341 of the server device 34. A deposit may also be made to the account by the operator of the mobile vehicle 1. As such, when the mobile vehicle 1 is parked on the docking platform 31, the server device 34 receives the identification signal, verifies the identification signal indeed corresponding to the account, and may further determine that the account has enough balance. The above process is exemplary and similar authentication means may be adopted, which still falls within the scope of the present invention.

After the server device 34 has authenticated the identification signal, the server device 34 transmits an actuation signal to the charging device 32 and the charging device 32 starts charging the mobile vehicle 1 after receiving the actuation signal. In the present embodiment, the charging device 32 produces a charging information according to the volume of electricity charged measured by the electricity measurement module 322, and delivers the charging information to the server device 34. After receiving the charging information, the server device (34) stores the charging information into an account of the storage unit 341 corresponding to the identification signal. The server device 34 may directly deduct the account balance, or store the charging information and bill the operator of the mobile vehicle 1 later. As such, the mobile vehicle charging system 3 not only can authenticate authorized mobile vehicles, but also can establish effective billing models, enhancing the present invention's industrial applicability.

As shown in FIGS. 2 and 3, the docking platform 31 may include a guidance module 35 to guide the mobile vehicle 1 to park on the docking platform 31. In the present embodiment, the guidance module 35 includes a number of light emitting diode (LED) indicator lamps so that the operator of the mobile vehicle 1 is able to locate the docking platform 31, and park the mobile vehicle 1 onto the docking platform 31 smoothly. Alternatively, other eye-catching planar or three-dimensional graphical signs, or even homing beacon may be employed as the guidance module 35 to facilitate the parking of the mobile vehicle 1 onto the docking platform 31.

As shown in FIG. 3, the docking platform 31 further includes a level calibration module 36. In the present embodiment, automatic level calibration arms are used as the level calibration module 36. These arms automatically detect and adjust the docking platform 31's degree of levelness so that the mobile vehicle 1 does not fall off from the docking platform 31 when mobile vehicle 1 is parked on the docking platform 31 and the docking platform 31 is tilted due to the weight or impact by the mobile vehicle 1. As shown in FIG. 2, to further enhance the stability of the mobile vehicle 1's parking on the docking platform 31, the docking platform 31 of the present embodiment further includes a positioning module 37 (not shown in FIG. 3) which may be a holding arm or other fixation means, or even a magnetic element capable of attracting the mobile vehicle 1 so as to steadily hold the mobile vehicle 1 on the docking platform 31 when the mobile vehicle 1 is parked on the docking platform 31.

As shown in FIGS. 2 and 3, the mobile vehicle charging system 3 may further include a camera module 38 and an image processing device 39. The camera module 38 is configured on the docking platform 31 for capturing images within a coverage range around the docking platform 31 and turning the captured images into an image signal. In the present embodiment, the camera module 38 is able to cover 360-degree around the docking platform 31, and therefore is able to capture any mobile vehicle 1's image when it approaches the docking platform 31 without any blind spot. The image processing device 39 is linked with the camera module 38 through a network and receives the image signal through the network.

Alternatively, the image processing device 39 includes a playback module 391 to play the image signal received from the camera module 38. For example, the image processing device 39 may be a mobile phone, a tablet, or a display configured on a controller for operating the mobile vehicle 1. A software capable of receiving and playing the image signal is installed on the image processing device 39. The operator of the mobile vehicle 1 is able to view the images taken by the camera module 38 through the image processing device 39. As such, if for security's sake or if there is a need to monitor the mobile vehicle 1 (for example, some regulation for UAVs by the authority requires that an UAV should always be within the sight of the UAV operator), the operator is able to monitor the mobile vehicle 1 at all times through the image processing device 39.

In alternative embodiments, the image processing device 39 is linked with the camera modules 38 of multiple docking platforms 31, and is able to receive the image signals separately from the camera modules 38. The playback module 391 may play these image signals from the camera modules 38 simultaneously in a split screen, or play the image signal from a specific camera module 38 freely selected by the operator of the mobile vehicle 1 through an interactive menu provided by the software. The operator of the mobile vehicle 1 therefore is able to view images of the mobile vehicle 1 from different perspectives simultaneously so as to fully grasp the status of the mobile vehicle 1. It should be noted that, in the present embodiment, the image processing device 39 is directly linked with the camera module 38 of the docking platform 31, instead of having the docking platform 31 transmit the image signal captured by the camera module 38 to the server device 34 first, and then having the server device 34 transmit the image signal to the image processing device 391 through the network. As such, images are delivered more efficiently, and the operator of the mobile vehicle 1 is able to view the most recent images. As described, the camera modules 38 of multiple docking platforms 31 jointly form a grid, more precise or widespread surveillance can be achieved through the integration of the image signals from the camera modules 38, thereby enhancing the surveillance effect of the mobile vehicle 1 along its movement path.

Figure 4:
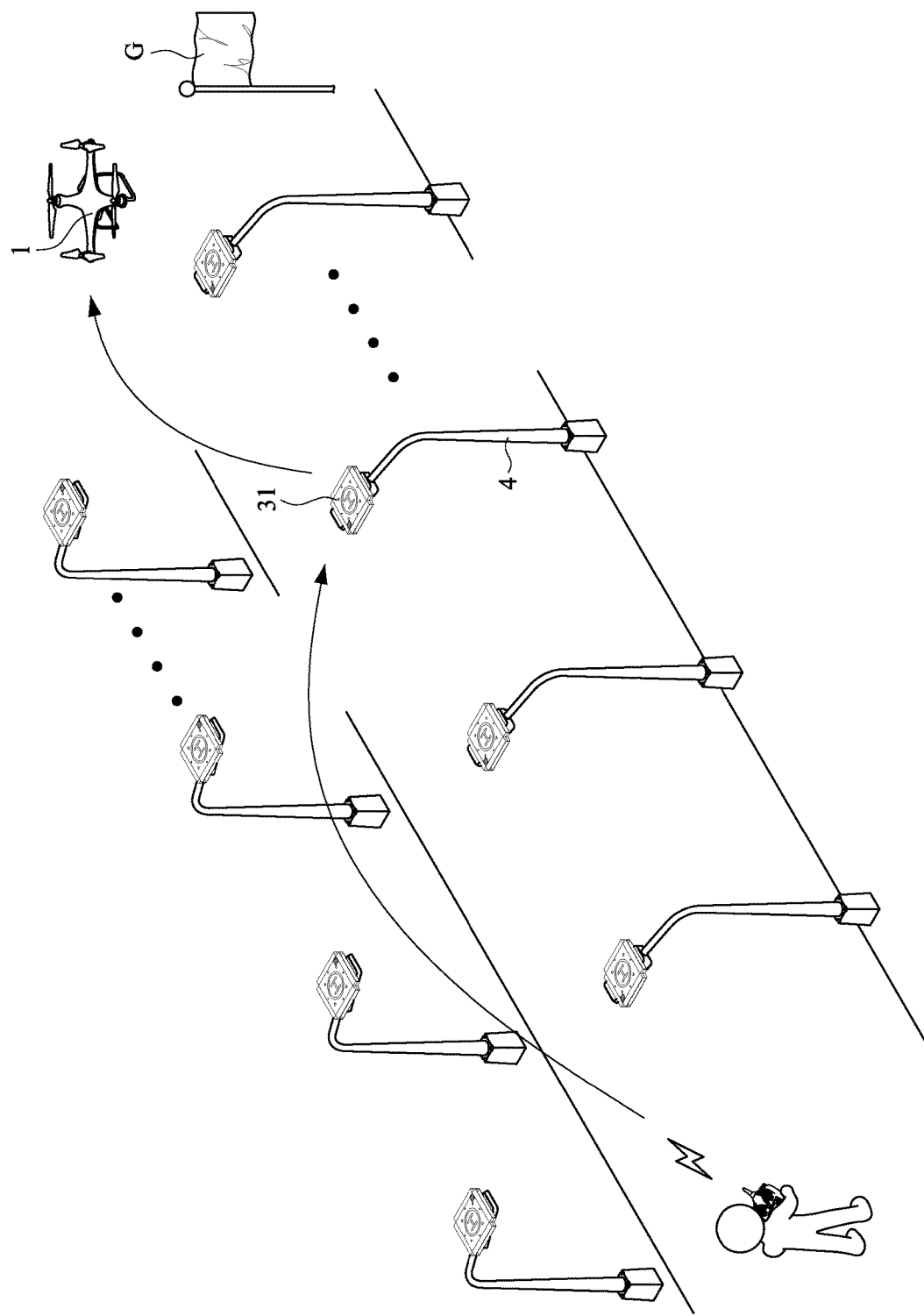
FIG. 4 is a perspective diagram showing the scenario of a mobile vehicle operated along with the mobile vehicle charging system of FIG. 2.

In order to more completely and fully deploy the mobile vehicle charging system 3 of the present invention, so that the operator of the mobile vehicle 1 can charge the mobile vehicle 1 any time and any place through the mobile vehicle charging system 3, in the present embodiment as shown in FIG. 4, multiple docking platforms 31 are configured on a number of street lamps 4, respectively. When the operator of the mobile vehicle 1 directs the mobile vehicle 1 to move towards a farther target location the mobile vehicle 1 can be parked on a docking platform 31 of any street lamp 4 and recharged when the mobile vehicle 1 encounters insufficient electricity along the way. Please note that, since the street lamps 4 are existing and ubiquitous facilities and no additional expense or space is required, the mobile vehicle charging systems 3 can be quickly deployed, resolving the problems of budget limitation and space availability.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A mobile vehicle charging system for a mobile vehicle, the mobile vehicle comprising a power module, a battery module, and an electricity reception interface where the mobile vehicle is moved by the power module, the battery module is electrically connected to the power module, and provides electricity to the power module, and the electricity reception interface is electrically connected to the battery module and receives electricity through induction in a wireless manner, the mobile vehicle charging system comprising:

a docking platform for the mobile vehicle to park;

a charging device comprising an electricity transmission interface and an electricity measurement module; and a level calibration module configured on the docking platform for automatically detecting and adjusting a degree of levelness of the docking platform;

wherein, when the mobile vehicle is parked on the docking platform, the electricity transmission interface charges the battery module through the electricity reception interface; and the electricity measurement module is electrically connected to the electricity transmission interface and measures a volume of electricity transmitted through the electricity transmission interface.

2. The mobile vehicle charging system according to claim 1, wherein the mobile vehicle further comprises an identification tag; the mobile vehicle charging system further comprises an identification module configured in the docking platform; and, when the mobile vehicle is parked on the docking platform, the identification module detects the identification tag on the mobile vehicle and, after the identification tag is authenticated, engages the charging device to charge the mobile vehicle.

3. The mobile vehicle charging system according to claim 2, further comprising a server device wherein the server device comprises a storage unit storing a plurality of account data; the server device is linked with the identification module and the charging device through a network; the server device receives an identification signal from the identification module after detecting the identification tag through the network; the server device stores the identification signal in the storage unit, and compares the identification signal against the account data in the storage unit for authentication; and, after the identification signal is authenticated, the server device transmits an actuation signal to the charging device and the charging device starts charging the mobile vehicle after receiving the actuation signal.

4. The mobile vehicle charging system according to claim 3, wherein the charging device produces a charging information according to a volume of electricity charged measured by the electricity measurement module, and delivers the charging information to the server device; and, after receiving the charging information, the server device stores the charging information into an account of the storage unit corresponding to the identification signal.

5. The mobile vehicle charging system according to claim 1, further comprising a guidance module configured on the docking platform for guiding the mobile vehicle to park on the docking platform.

6. The mobile vehicle charging system according to claim 1, further comprising a positioning module configured on the docking platform for steadily positioning the mobile vehicle on the docking platform when the mobile vehicle is parked on the docking platform.

7. The mobile vehicle charging system according to claim 1, further comprising
   a camera module configured on the docking platform for capturing images within a coverage range around the docking platform and turning the captured images into an image signal; and
   an image processing device linked with the camera module through a network and receiving the image signal through the network;
   wherein the image processing device comprises a playback module for playing the image signal received from the camera module.

8. The mobile vehicle charging system according to claim 7, wherein the image processing device is linked with a plurality of camera modules on a plurality of docking platforms, and receives the image signals separately from the camera modules.

9. The mobile vehicle charging system according to claim 1, wherein the docking platform is configured on a street lamp.

10. The mobile vehicle charging system according to claim 2, wherein the docking platform is configured on a street lamp.

11. The mobile vehicle charging system according to claim 3, wherein the docking platform is configured on a street lamp.

12. The mobile vehicle charging system according to claim 4, wherein the docking platform is configured on a street lamp.

13. The mobile vehicle charging system according to claim 5, wherein the docking platform is configured on a street lamp.

14. The mobile vehicle charging system according to claim 6, wherein the docking platform is configured on a street lamp.

15. The mobile vehicle charging system according to claim 7, wherein the docking platform is configured on a street lamp.

16. The mobile vehicle charging system according to claim 8, wherein the docking platform is configured on a street lamp.

* * * * *